(12) United States Patent
Kim et al.

(10) Patent No.: US 9,751,074 B2
(45) Date of Patent: Sep. 5, 2017

(54) METAL ORGANIC FRAMEWORKS FOR ELECTRONIC GAS STORAGE

(71) Applicant: NUMAT TECHNOLOGIES, INC., Skokie, IL (US)

(72) Inventors: Han Sung Kim, Evanston, IL (US); Mitchell Hugh Weston, Chicago, IL (US); Patrick Fuller, Chicago, IL (US); Paul Wai-Man Siu, Evanston, IL (US)

(73) Assignee: NUMAT TECHNOLOGIES, INC., Skokie, IL (US)

( * ) Notice: Subject to any disclaimer, the term of this patent is extended or adjusted under 35 U.S.C. 154(b) by 0 days.

(21) Appl. No.: 14/828,097

(22) Filed: Aug. 17, 2015

(65) Prior Publication Data
US 2015/0352519 A1 Dec. 10, 2015

Related U.S. Application Data

(63) Continuation of application No. 14/450,994, filed on Aug. 4, 2014, now Pat. No. 9,138,720.

(60) Provisional application No. 61/862,238, filed on Aug. 5, 2013.

(51) Int. Cl.
| | |
|---|---|
| *B01J 20/28* | (2006.01) |
| *B01J 20/22* | (2006.01) |
| *B01J 20/30* | (2006.01) |
| *F17C 11/00* | (2006.01) |

(52) U.S. Cl.
CPC ......... *B01J 20/226* (2013.01); *B01J 20/2808* (2013.01); *B01J 20/28011* (2013.01); *B01J 20/28016* (2013.01); *B01J 20/28042* (2013.01); *B01J 20/28066* (2013.01); *B01J 20/28076* (2013.01); *B01J 20/28083* (2013.01); *B01J 20/3085* (2013.01); *F17C 11/00* (2013.01); *Y02C 10/08* (2013.01)

(58) Field of Classification Search
CPC ....... B01J 20/226; B01J 20/3085; F17C 11/00
USPC ...................... 556/52, 112; 502/401; 206/0.7
See application file for complete search history.

(56) References Cited

U.S. PATENT DOCUMENTS

| | | |
|---|---|---|
| 3,144,418 A | 8/1964 | Hill et al. |
| 5,935,305 A | 8/1999 | Tom et al. |
| 7,652,132 B2 | 1/2010 | Yaghi et al. |
| 8,372,998 B2 | 2/2013 | Schubert et al. |
| 2003/0148165 A1 | 8/2003 | Muller et al. |
| 2011/0160511 A1 | 6/2011 | Hupp et al. |
| 2013/0053585 A1 | 2/2013 | Long et al. |
| 2015/0034500 A1 | 2/2015 | Kim et al. |

FOREIGN PATENT DOCUMENTS

| | | |
|---|---|---|
| CN | 1181716 A | 5/1998 |
| CN | 1617761 A | 5/2005 |
| CN | 101384537 A | 3/2009 |
| CN | 101641152 A | 2/2010 |
| CN | 102574886 A | 7/2012 |
| CN | 103068474 A | 4/2013 |
| DE | 10111230 A1 | 9/2002 |
| EP | 1070538 A2 | 1/2001 |
| EP | 1905503 A2 | 4/2008 |
| EP | 2540708 A1 | 1/2013 |
| JP | 2005-525218 A | 8/2005 |
| JP | 2005525218 A | 8/2005 |
| KR | 2012-0129905 A | 11/2012 |
| KR | 1020120129905 A | 11/2012 |
| WO | WO9744118 A1 | 11/1997 |
| WO | WO03/064030 A1 | 8/2003 |
| WO | WO2009133366 A2 | 11/2009 |
| WO | WO2011/146155 A2 | 11/2011 |

OTHER PUBLICATIONS

International Search Report and Written Opinion, International Application No. PCT/US2014/049617, issued Nov. 12, 2014.
Chen et al., "Interwoven Metal-Organic Framework on a Periodic Minimal Surface with Extra-Large Pores," Science vol. 291, Feb. 9, 2001, pp. 1021-1023.
Chun et al., "Concomitant Formation of N-Heterocyclic Carbene-Copper Complexes within a Supramolecular Network in the Self-Assembly of Imidazolium Dicarboxylate with Metal Ions," Inorganic Chemistry, vol. 48, Jun. 2009, pp. 6353-6355.
Chun et al., "$Cu_2O$: A Versatile Reagent for Base-Free Direct Synthesis of NHC-Copper Complexes and Decoration of 3D-MOF with Coordinatively Unsaturated NHC-Copper Species," Organometallics, vol. 29, Mar. 2010, pp. 1518-1521.
Eddaoudi et al., "Highly Porous and Stable Metal-Organic Frameworks: Structure Design and Sorption Properties," J. Am. Chem. Soc., vol. 122, Feb. 2000, pp. 1391-1397.

(Continued)

*Primary Examiner* — Porfirio Nazario Gonzalez
(74) *Attorney, Agent, or Firm* — The Marbury Law Group PLLC

(57) ABSTRACT

A metal organic framework (MOF) includes a coordination product of a metal ion and an at least bidentate organic ligand, where the metal ion and the organic ligand are selected to provide a deliverable adsorption capacity of at least 70 g/l for an electronic gas. A porous organic polymer (POP) includes polymerization product from at least a plurality of organic monomers, where the organic monomers are selected to provide a deliverable adsorption capacity of at least 70 g/l for an electronic gas.

22 Claims, 10 Drawing Sheets
(9 of 10 Drawing Sheet(s) Filed in Color)

(56) References Cited

OTHER PUBLICATIONS

Eddaoudi et al., "Modular Chemistry: Secondary Building Units as a Basis for the Design of Highly Porous and Robust Metal-Organic Carboxylate Frameworks," Acc. Chem. Res., vol. 34, Feb. 2001, pp. 319-330.
Eddaoudi et al., "Systematic Design of Pore Size and Functionality in Isoreticular MOFs and Their Application in Methane Storage," Science vol. 295, Jan. 18, 2002, pp. 469-472.
Fletcher et al., "Adsorption Dynamics of Gases and Vapors on the Nanoporous Metal Organic Framework Material Ni-2(4,4'-bipyridine)(3)(NO3)(4): Guest Modification of Host Sorption Behavior," J. Am. Chem. Soc., vol. 123, Sep. 2001, pp. 10001-10011.
Li et al., "Design and Synthesis of an Exceptionally Stable and Highly Porous Metal-Organic Framework," Nature, vol. 402, Nov. 18, 1999, pp. 276-279.
Oisaki et al., "A Metal-Organic Framework with Covalently Bound Organometallic Complexes," J. Am. Chem. Soc., vol. 132, Jul. 2010, pp. 9262-9264.
Wilmer et al., "Large-scale Screening of Hypothetical Metal-Organic Frameworks," Nature Chemistry, vol. 4, Feb. 2012.
Wilmer et al., "Structure-property Relationships of Porous Materials for Carbon Dioxide Separation and Capture," Energy Environ. Sci., 2012, 5, 9849.
Raynor et al., "Sub-atmospheric Pressure Gas Sources for Bulk Storage and Delivery of Arsine and Phosphine of MOCVD Tools," Journal of Crystal Growth, 248, (2003), pp. 77-81.
Brown et al., "New Regs on Sub-atmospheric Gas Sources Reduce Risk Improve Safety," Solid State Technology, vol. 52, Aug. 2009.
Chae et al., "A Route to High Surface Area, Porosity and Inclusion of Large Molecules in Crystals," Nature, vol. 427, Feb. 5, 2004.
Furukawa et al., "Ultra-high Porosity in Metal-Organic Frameworks," Science Express, Jul. 2010.
Farha et al., "Metal-Organic Framework Materials with Ultrahigh Surface Areas: Is the Sky the Limit?" Journal of the American Chemical Society, vol. 134, Aug. 2012.
Li et al., "Design and Synthesis of an Exceptionally Stable and Highly Porous Metal-Organic Framework," Nature, vol. 402, Nov. 18, 1999.
Farha et al., "De novo Synthesis of a Metal-Organic Framework Material Featuring Ultrahigh Surface Area and Gas Storage Capacities," Nature Chemistry, vol. 2, Nov. 2010.
Nelson et al., "Supercritical Processing as a Route to High Internal Surface Areas and Permanent Microporosity in Metal#Organic Framework Materials," J. Am. Chem. Soc., 2009, 131 (2).
Ferey et al., "A Chromium Terephthalate-Based Solid with Unusually Large Pore Volumes and Surface Area," Science, vol. 309, Sep. 23, 2005.
Ferey et al., "Hybrid Porous Solids: Past, Present, Future," Chem. Soc. Rev. 2008, vol. 37, pp. 191-214.
www.mathesongas.com : "Semiconductor Gases: Semiconductor Pure Gases," webpage, Aug. 28, 2015, 2pgs.
International Searching Report and Written Opinion of the International Searching Authority for PCT/US2014/049617, 11 pages, mailed Nov. 12, 2015.
Chun et al., "Synthesis, X-Ray Crystal Structures, and Gas Sorption Properties of Pillared Square Grid Nets Based on Paddle-Wheel Motifs: Implications for Hydrogen Storage in Porous Materials," Chemistry—A European Journal, vol. 11, No. 12, Jun. 6, 2005, pp. 3521-3529.
EP Application No. 14834590, Extended European Search Report, issued Mar. 15, 2017, 19pgs.
First Office Communication of China State Intellectual Property Office for Chinese Patent Application No. 201480048872.3, official issued date May 5, 2017, 31 pages including English-language Translation.

FIG. 1e  Zn²⁺ + 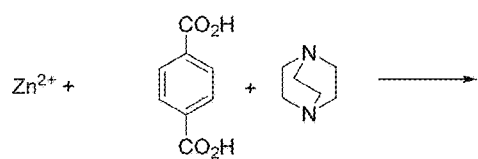 → 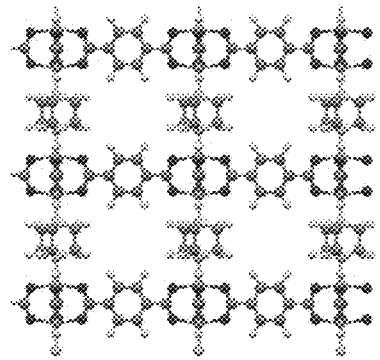
(pillared-paddlewheel framework; ZnBDCDABCO)
(BDC equals benzene dicarboxylate)
(DABCO equals 1,4-diazabicyclo[2.2.2]octane)
FIG. 1f  Cu²⁺ + 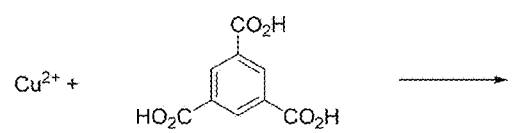 → 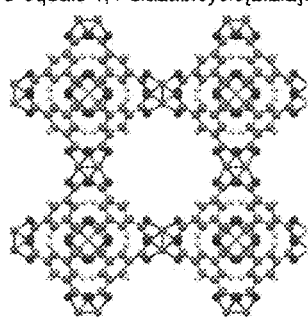
(paddlewheel framework; Cu-BTC)
(BTC equals benzene tricarboxylate)
FIG. 1g  Cu²⁺ + 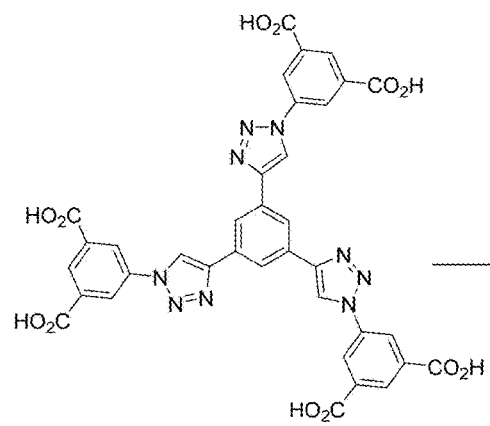 → 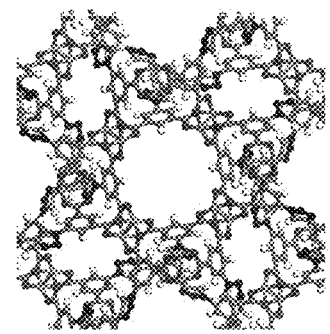
(*rht* framework; NU-125)

(Zn₄O framework; MOF-5)

(Zr₆O₃₂ or Zr₆O₃₀ framework; UiO-66)

(heterocycle framework; ZIF-8)

M = any tetrahedral atom including
B, N, Al, C, Si, Sn, Ge, etc
R = any generic group attached at any position NuMatPOP1
Each M-M is attached by a biphenyl group,
as illustrated in the one example.
(tetrahedral POP framework)

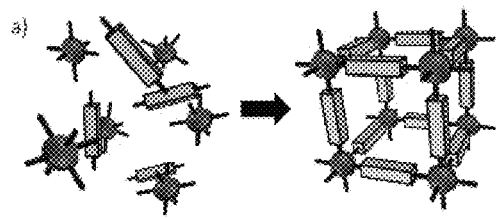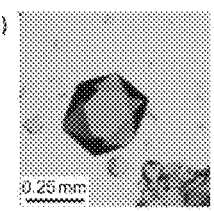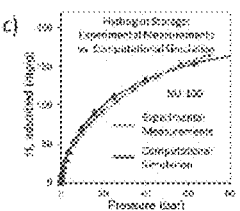
FIG. 2a    FIG. 2b    FIG. 2c
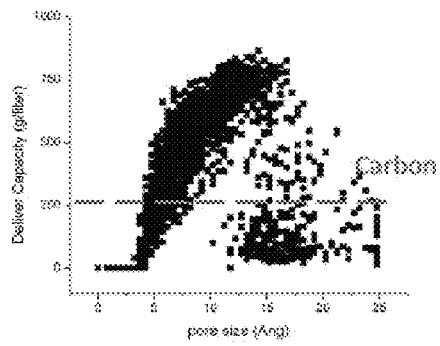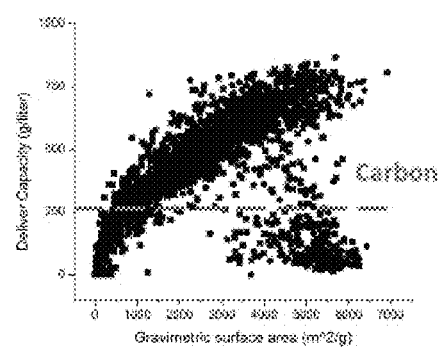
FIG. 3a    FIG. 3b
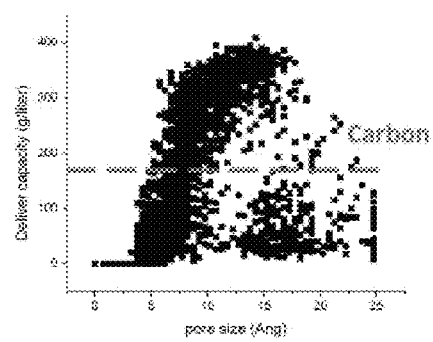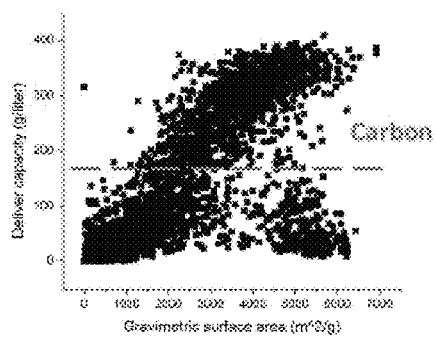
FIG. 3c    FIG. 3d

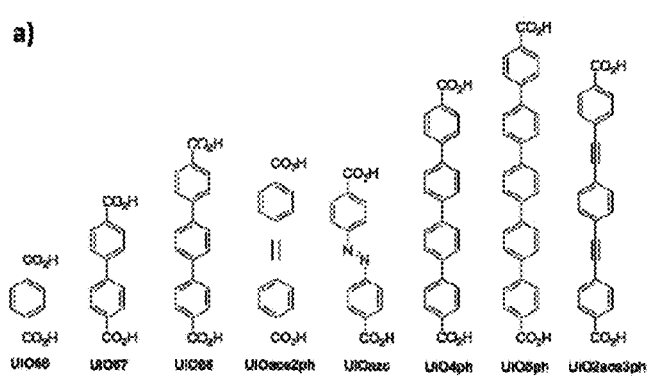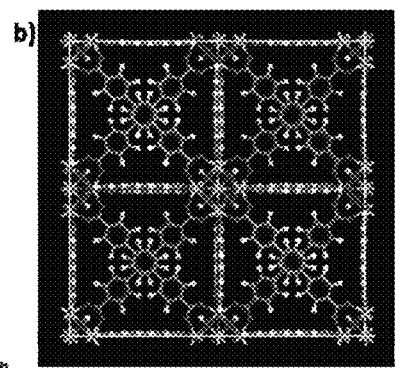
FIG. 4a  FIG. 4b
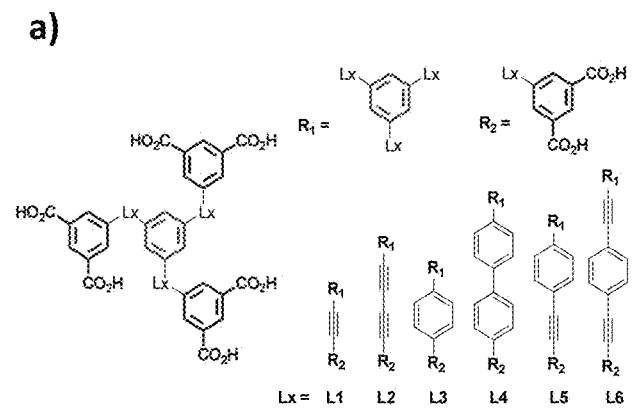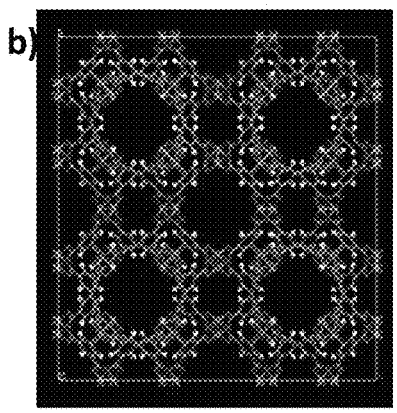
FIG. 5a  FIG. 5b

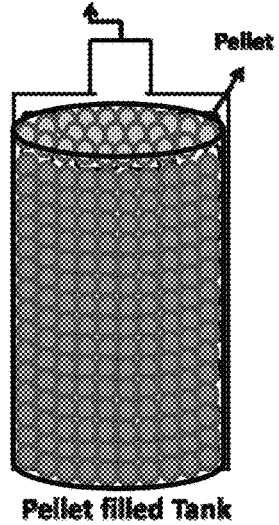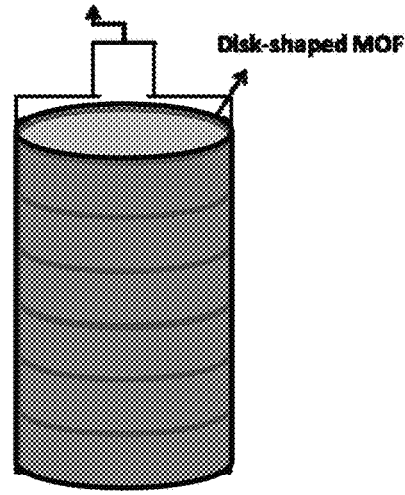
FIG. 8a          FIG. 8b
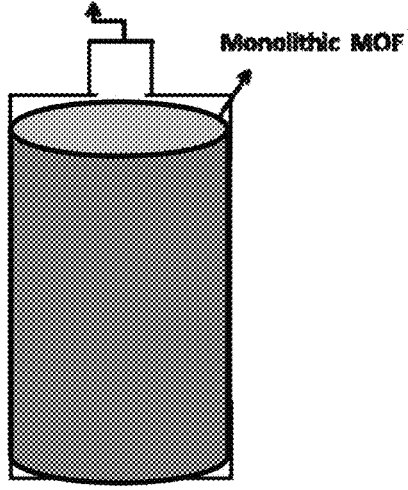
FIG. 8c

METAL ORGANIC FRAMEWORKS FOR ELECTRONIC GAS STORAGE

RELATED APPLICATIONS

This application is a continuation of U.S. application Ser. No. 14/450,994, filed Aug. 4, 2014, which claims the benefit of U.S. Provisional Application No. 61/862,238, filed Aug. 5, 2013, both are hereby incorporated by reference in their entirety.

FIELD

The present invention is directed to porous materials including metal-organic frameworks and porous organic polymers, specifically metal organic frameworks and porous organic polymers for electronic gas storage.

BACKGROUND

Extensive research over the past few years has been focused on the synthesis and characterization of microporous materials with high internal surface areas. Metal-Organic Frameworks (MOFs), a crystalline subset of these materials, have shown promise in a wide range of applications from gas storage and separation applications. MOFs are composed of at least ditopic organic linkers and one metal ion. Metal ions of MOFs include, but are not limited to, $Li^+$, $Na^+$, $Rb^+$, $Mg^{2+}$, $Ca^{2+}$, $Sr^{2+}$, $Ba^{2+}$, $Sc^{2+}$, $Ti^{4+}$, $Zr^{4+}$, $Ta^{3+}$, $Cr^{3+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ni^{2+}$, $Ni^+$, $Pd^{2+}$, $Pd^+$, $Pt^{2+}$, $Cu^{2+}$, $Cu^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{3+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$ and combinations thereof. MOFs (Metal Organic Framework) are porous materials with compelling capabilities for gas storage (FIG. 1). Their development has accelerated in the past decade [1-3] because of favorable performance characteristics as a result of their high surface area, porosity and stability [3-8]. Additionally, porous organic polymers (POPs), are porous materials made from only organic building units, have favorable performance characteristics as a result of their high surface area, porosity, extreme stability, and short range crystallinity.

SUMMARY

Embodiments of the invention are drawn to (a) the development of novel MOF structures for the storage of electronic gases at pressures below 760 torr, and (b) the integration of these structures into a gas delivery system, enabling a significant increase in delivered storage capacity over existing solutions. An embodiment relates to a metal organic framework (MOF) including the coordination product of a metal ion and an at least bidentate organic ligand, wherein the metal ion and the organic ligand are selected to provide a deliverable adsorption capacity of at least 70 g/l for an electronic gas.

Another embodiment relates to a method of making a metal organic framework (MOF) including reacting a metal ion and an at least bidentate organic ligand, wherein the metal ion and the organic ligand are selected to provide a deliverable adsorption capacity of at least 70 g/l for an electronic gas.

Another embodiment relates to a method of using a metal organic framework (MOF) comprising at least a plurality of organic monomers, including filling a cylinder with a MOF, charging the MOF-filled cylinder with an electronic gas at pressures below 760 torr, storing the electronic gas in the MOF-filled cylinder, and dispensing the electronic gas under vacuum. The MOF includes a deliverable adsorption capacity of at least 70 g/l for the electronic gas.

Further embodiments of the invention are drawn to (a) the development of novel porous organic polymers (POP) for the storage of electronic gases at pressures below 760 torr, and (b) the integration of these structures into a gas delivery system, enabling a significant increase in delivered storage capacity over existing solutions. An embodiment relates to a POP comprising the polymerization from at least a plurality of organic monomers and comprising at least a plurality of linked organic repeating units, wherein the linked organic repeating units are selected to provide a porous material and selected to provide a porous material with a deliverable adsorption capacity of at least 70 g/l for an electronic gas.

Another embodiment relates to a method of making a porous organic polymer (POP) including reacting a plurality of organic monomers, wherein the organic monomers are selected to provide a deliverable adsorption capacity of at least 70 g/l for an electronic gas.

Another embodiment relates to a method of using a porous organic polymer (POP) comprising at least a plurality of organic monomers, including filling a cylinder with a POP, charging the POP-filled cylinder with an electronic gas at pressures below 760 torr, storing the electronic gas in the POP-filled cylinder, and dispensing the electronic gas under vacuum. The POP includes a deliverable adsorption capacity of at least 70 g/l for the electronic gas.

BRIEF DESCRIPTION OF THE DRAWINGS

The patent of application file contains at least one drawing executed in color. Copies of this patent or patent application publication with color drawing (s) will be provided by the office upon request and payment of the necessary fee.

FIGS. 1e-1k are illustrations of sorbent materials including the formation of metal organic frameworks (e) ZnBDCDABCO (pillared-paddlewheel framework), (f) Cu-BTC (paddlewheel framework), (g) NU-125 (rht framework), (h) $Zn_4O$-BDC ($Zn_4O$ framework), (i) Zr-BDC ($Zr_6O_{32}$ or $Zr_6O_{30}$ framework), (j) ZIF-8 (heterocycle framework) and the formation of porous organic polymers (k) PAF-1 (tetrahedral POP framework).

FIG. 2a is a schematic illustration of a method of self-assembly of a MOF according to an embodiment.

FIG. 2b is a micrograph of a MOF according to an embodiment.

FIG. 2c is a plot comparing simulated and experimental hydrogen adsorption as a function of pressure of an NU-100 MOF.

FIGS. 3a, 3c, 3e, 3g and 3i are plots of simulated deliverable capacity in g/L as a function of pore size including (a) $AsH_3$, (c) $PH_3$, (e) $SbH_3$, (g) $B_2H_6$, and (i) $BF_3$ for a large library of MOFs.

FIGS. 3b, 3d, 3f, 3h and 3j are plots of simulated deliverable capacity in g/L as a function of gravimetric surface area including (b) $AsH_3$, (d) $PH_3$, (f) $SbH_3$, (h) $B_2H_6$, and (j) $BF_3$ for a large library of MOFs.

FIG. 4a illustrates the chemical formulas of protonated precursors of linkers used to construct a MOF series.

FIG. 4b is a simulated crystal structure of MOF UiO68.

FIG. 5a illustrates the chemical formulas of hexa-protonated precursors of the linker used to construct the isostructural copper-based rht MOF series.

FIG. 5b is a simulated crystal structure of a copper-based rht MOF with a L1 precursor.

FIGS. 8a-8c illustrate MOF or POP based gas storage and delivery system including (a) a pellet filed tank, (b) a disk filled tank and (c) a monolithic filled tank.

DETAILED DESCRIPTION

Figure 1A:
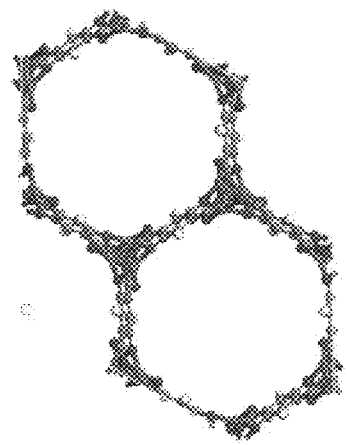
FIGS. 1a-1d are ball and stick illustrations of metal organic frameworks including (a) CoMOF74, (b) NU-110, (c) NU-111 and (d) NU-125.
Figure 1B:
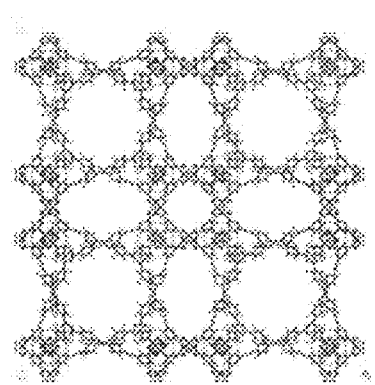
Figure 1C:
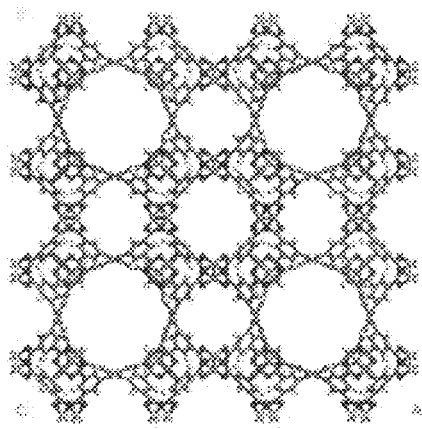
Figure 1D:
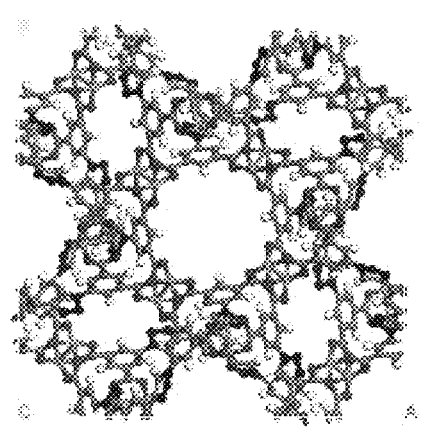
Figure 1H:
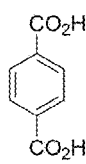
Figure 1H:
Figure 1H:
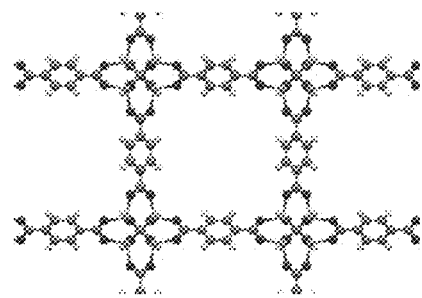
Figure 1I:
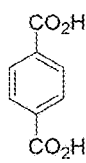
Figure 1I:
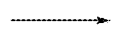
Figure 1I:
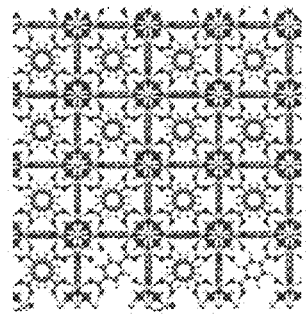
Figure 1J:
Figure 1J:
Figure 1J:
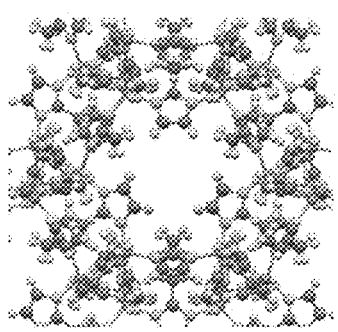

Conventionally, lower-performing porous materials, such as zeolites and activated carbon, have been used for the storage of electronic gases. While significant research has explored the use of MOFs for the storage of commodity gases such as methane or hydrogen, little attention has been paid to the use of MOFs as a commercially viable adsorption solution for electronic gases used in the semiconductor industry. As used herein, "electronic gases" are source gases used for fabrication of solid state devices, such as transistors, diodes, light emitting diodes, lasers, solar cells, capacitors, etc. The electronic gases may be used for doping (e.g., as ion implantation source gases or chemical vapor deposition (CVD) or atomic layer deposition (ALD) gas phase dopant sources) or layer deposition (e.g., such as CVD or ALD source gases) of semiconductor (e.g., Group IV, III-V, II-VI or other compound semiconductors), insulators (e.g., silicon oxide, silicon nitride, etc.) and conductors (e.g., tungsten, etc.) in solid state devices.

MOF-based adsorbents may be used to store electronic gases in high concentrations between 0-250 bar, which enables the optimization of storage capacity and safety trade-offs for different gases. While activated carbon has been used for sub-atmospheric storage of these gasses, their concentrations in the cylinders is low due to the weak binding of the electronic gases, such as arsine and phosphine, to the pores of this adsorbent. At similar pressure regimes, MOF and POPs adsorbents exhibit improved capacity and gas densities when compared to activated carbon. Thus, the use of MOFs and POPs provides improved electronic gas storage methods and delivery systems. This performance improvement significantly reduces storage device costs and promotes safety as a result of reduced cylinder change-outs and worker contact.

The electronic gas industry uses heavy metallic cylinders to store gases, which results in significant compression, storage, handling, and delivery costs. Chemical, semiconductor manufacturers and nanomaterials fabrication facilities purchase a wide range of industrial and electronic gases for use in production and manufacturing equipment.

Historically, ion implantation has been considered a hazardous process in a semiconductor fabrication facility. For example, electronic gases used in implantation or vapor deposition, such as arsine, are fatal at concentrations over 25 parts per million. Phosphine is fatal at concentrations over 50 parts per million. As a result, ion implanters have been isolated to minimize potential exposure to the toxic gases used during implant. High-pressure cylinders located in a confined area inside the implanter have presented a risk for semiconductor manufacturers. In response, the semiconductor industry has learned to reduce the risk of leaks through the use of source isolation, ventilation, gas-detector technology, improved gas delivery components and systems, treatment systems to prevent discharges-to-atmosphere above allowable limits and through extensive personnel training. While the risk of using highly toxic gases for ion implantation is reduced through the use of embedded mechanical controls to mitigate cylinder pressure, and by removing pressure from the gas delivery system, both require a vacuum to be in place before gas is delivered from the cylinder to a semiconductor manufacturing tool.

While high compression cylinders are still in use today, sub-atmospheric pressure gas sources (SAGs) were developed to enable semiconductor manufacturers to overcome the risk to workers posed by high-pressure toxic gases. These SAGs satisfied health and safety requirements and regulations. This adsorbent technology stores toxic electronic gases below atmospheric pressure, removing the concern of catastrophic releases of high-pressure toxic electronic gases. More specifically, the SAGs include a gas source package that stores and delivers gas at sub-atmospheric pressures. This package includes a gas cylinder and outlet valve, operated by reversibly adsorbing electronic gases (such as arsine, phosphine, boron trifluoride and germanium tetraflouride) with a relatively high surface area matrix. The adsorbed gas is in a lower energy state and exhibits a significant vapor-pressure reduction. The adsorbent loading (the saturation of the gas into the adsorbent) is 30-50% by weight and the pressure is 650 torr at 25 degrees Celsius. A vacuum provides the motive force to displace the gas/solid equilibrium and then convey the gas to the point of use.

However, a major limitation of SAGs is that the adsorbents, comprised primarily of activated carbon, have limited surface areas. Activated carbon adsorbents have amorphous (random shapes and sizes) pores, in which some pore spaces are too tight, some are too large and others cannot be accessed. Thus, activated carbon has inherent limitations and there is a need for porous materials with more uniform well-defined pore size, pore accessibility, and greater storage capacity such sorbents include MOFs and/or POPs. Additionally, to maximize storage of toxic electronic gases in current SAG cylinders, activated carbon sorbents are pressed into large disk-shaped monoliths. As a result, cylinders need to be built around the sorbents using a two-step welding process, adding significant complexity and system cost.

MOFs have the highest surface area per gram (believed to be up to 14,500 $m^2/g$) in comparison to any known adsorbent materials. In fact, MOFs have an internal surface area that significantly exceeds activated carbon, [10, 11] and MOFs have greater design flexibility in comparison to zeolites. MOF adsorbents have significantly higher surface area and a higher effective storage capacity than the currently used activated carbon materials used in SAGs. MOFs enable safer gas packaging at improved economics by reducing the number of cylinder change-outs required. This results in a meaningful safety benefit as workers limit their interaction with cylinders, and also provides a cost benefit in the form of reduced machine down time as higher capacity cylinders require less change-outs.

MOF absorbents can be used in portable gas cylinders to allow for gas storage at significantly lower pressures. Thus, the use of MOFs will result in (1) reduced filling pressures, (2) lowered bill-of-materials through use of off-the-shelf storage containers as compared to welded cylinders for disk monoliths (3) reduced handling and delivery costs (4) improved worker safety, and (5) reduced machine downtime as a result of reduced cylinder change-outs. Further, MOFs can be used to significantly increase storage capacity of high value electronic gases that currently suffer from poor storage economics using high-pressure, or lower performing sorbents such as activated carbon or zeolites.

An embodiment of the present invention includes computationally designed and synthesized MOF's for the storage of electronic gases. An advantage of MOFs is that the molecular building blocks of MOFs, organic linkers and metal ions, self-assemble in a predictable way into uniform crystals (see FIG. 2a). This advantage can be leveraged to rapidly search and screen for optimal materials in silico through use of a computational MOF generator using few organic building blocks which ultimately builds a large library of MOFs.

FIG. 2a illustrates how MOFs self-assemble from molecular "building blocks" into predictable structures. After designing a MOF on a computer, as in the case of NU-100, the MOF may be synthesized, as shown in FIG. 2b, which is a micrograph of a NU-100 crystal taken with an optical microscope. Subsequent measurements of hydrogen storage capacity in the NU-100 MOF were in excellent agreement with simulations as illustrated in the plot of adsorbed hydrogen as a function of pressure illustrated in FIG. 2c.

Simulation results indicate that MOFs with gravimetric surface areas ranging between 1,000-14,500 m$^2$/g and pore sizes ranging from 2-25 Å between an operating pressure range of 0-760 torr may have favorable performance characteristics for the storage of the electronic gases, including, but not limited to the list shown in Table 1.

using similar methods (FIGS. 3e-3j). An embodiment includes a metal organic framework (MOF) comprising the coordination product of a metal ion and an at least bidentate organic ligand, wherein the metal ion and the organic ligand are selected to provide a deliverable adsorption capacity of at least 70 g/l, such as 190 g/l for an electronic gas. In an embodiment, the deliverable adsorption capacity is 70 to 840 g/l for the electronic gas.

Another embodiment includes the method of using a MOF comprised of a metal ion and an at least bidentate organic ligand where the MOF is used as an adsorbent in a cylinder to store and deliver electronic gases. The MOF has a storage capacity of at least 70 g/L and at most 840 g/L measured at 650 torr and 25° C.

In an attempt to gain more detailed insights, the direct effect of the linker length on the surface area, pore size, and pore volume were computationally studied while relating them with arsine deliverable adsorption capacities. Two series of MOFs were investigated: MOFs with zirconium metal nodes (FIGS. 4a-4b, UiO type MOFs) and copper-based MOFs with the rht topology (FIGS. 5a-5b, L1-L6 type MOFs). In the case of the zirconium-based MOFs, both known and hypothetically simulated MOFs were used to identify optimal pore sizes, pore volumes, and gravimetric surface areas for maximum deliverable adsorption capacity of arsine. For the rht topology series of MOFs, the MOFs studied herein are previously known from literature references. Combined, the optimal parameters of both families of MOFs investigated herein illustrate common parameters which provide high arsine adsorption and these findings can be expanded to many other MOF families.

Figure 6A:
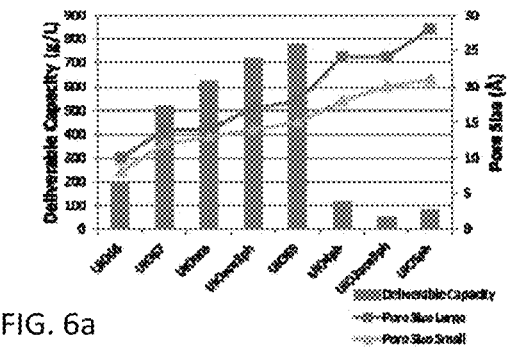
FIGS. 6a-6c illustrate the simulated delivery capacity of arsine as a function of (a) pore size, (b) pore volume and (c) gravimetric surface area for a series of Zr6032 framework MOFs.
Figure 6B:
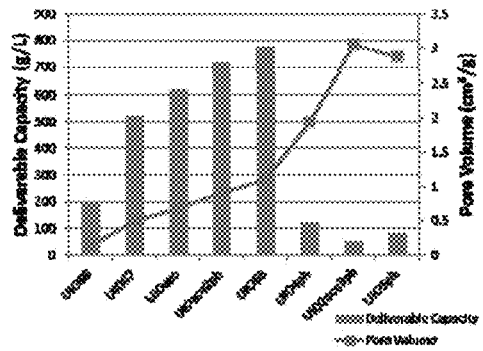
Figure 6C:
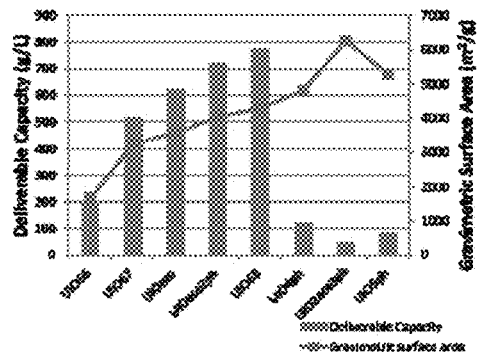

In both series of MOFs, the ability to tune pore volumes and pore sizes, in addition to surface area, illustrate the ability to control and maximize arsine adsorption. These findings were clearly evident in the UiO series of MOFs (FIGS. 6a-6c) as deliverable capacity of arsine increases

TABLE 1

| Electronic gases [12] | | | |
|---|---|---|---|
| Ammonia | Argon | Arsine | Boron Trichloride |
| Boron trifluoride | Carbon Dioxide | Carbon Monoxide | Carbonyl Sulfide |
| Chlorine | Deuterium | Diborane | Dichlorosilane |
| Difluoromethane | Disilane | Ethane | Ethylene |
| Fluorine | Germane | Gallium | Hexafluoroethane |
| Tetrafluoromethane | Perfluoropropane | Trifluoromethane | Difluoromethane |
| Methyl fluoride | Octafluorocyclopentene | Octafluorocyclobutane | Helium |
| Hydrogen | Xenon | Hexafluoroethane | Hydrogen Bromide |
| Hydrogen Chloride | Hydrogen Fluoride | Hydrogen Selenide | Hydrogen Sulfide |
| Krypton | Methane | Methyl Silane | Methyl Fluoride |
| Neon | Nitric Oxide | Nitrogen Trifluoride | Nitrous Oxide |
| Nitrogen | Perfluoropropane | Phosphine | Propylene |
| Silane | Trisilicon octahydride (Si$_3$H$_8$) (e.g., Silcore ®) | Silicon Tetrachloride | Silicon Tetrafluoride |
| Stibine | Sulfur Hexafluoride | Trichlorosilane | Trimethylsilane |
| Tungsten Hexafluoride | Acetylene | | |

The deliverable adsorption capacity, measured between 5 Torr (final discharging pressure) and 650 Torr (final charging pressure), of a library of possible MOFs obtained from a MOF computer simulation, was predicted using Grand Canonical Monte Carlo (GCMC) simulations. FIGS. 3a-3d illustrate how many MOFs, given their ranging pore sizes and gravimetric surface areas, have a 2-3 fold deliverable capacity increase for both AsH$_3$ and PH$_3$ relative to that of activated carbon. In FIGS. 3a-3j, each point signifies the deliverable capacity of one MOF derived from the MOF generator. Furthermore, the deliverable capacities for stibine, diborane, and boron trifluoride were also predicted with increasing pore sizes, pore volumes, and gravimetric surface areas starting with UiO66 (70 g/L, 8 and 10 Å, 0.13 cm$^3$/g, and 1680 m$^2$/g respectively) until the arsine deliverable capacity reached a maximum in UiO68 (775 g/L, 15 and 8 Å, 1.1 cm$^3$/g, and 4300 m$^2$/g respectively). However beyond UiO68, the deliverable capacity of arsine drastically decreases with further increasing pore sizes and pore volumes which is illustrated by UiO4ph (120 g/L, 18 and 24 Å, and 1.9 cm$^3$/g respectively). An embodiment includes a MOF which has a first type of pore having an average pore size between 15 Å and 25 Å. In another embodiment, the MOF further includes a second type of pore, the second type of pore having a smaller pore size between 8 Å and 15 Å. In an embodiment, the MOF has a gravimetric surface area between 1,000 and 14,500 m²/g and a pore volume between 1 and 3 cm²/g. In an embodiment, the metal ion comprises $Zr^{4+}$ and the at least bidentate organic ligand is selected from UiOace2ph and UiOazo.

Figure 7A:
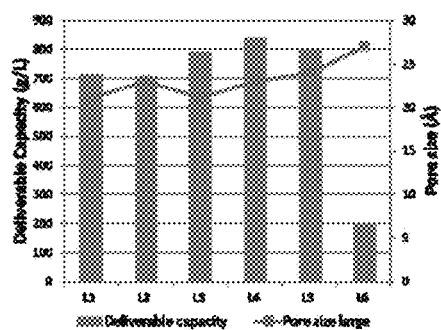
FIGS. 7a-7c illustrate the simulated delivery capacity of arsine as a function of (a) pore size, (b) pore volume and (c) gravimetric surface area for a series of rht framework MOFs.
Figure 7B:
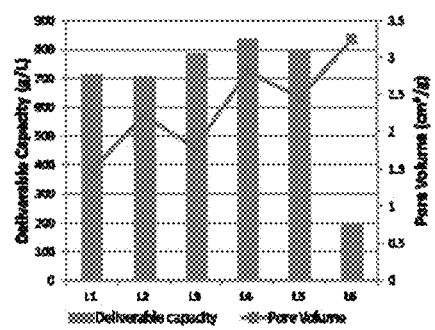
Figure 7C:
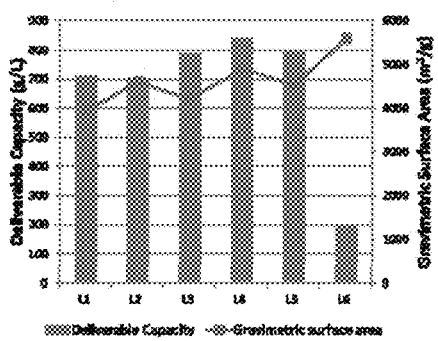

Gravimetric surface does not appear to be as dominant a factor as either pore sizes or pore volumes in the deliverable capacity of arsine. This is illustrated in the rht series of analyzed MOFs (FIGS. 7a-7c). This family of MOFs have similar gravimetric surface areas ranging from 4000 to 5500 m²/g in MOFs based on L1 to L6 ligand precursors. Although they have similar surface areas, the deliverable capacity of arsine increases with increasing pore sizes and pore volumes reaching a maximum in L4 (840 g/L, 23 Å, and 2.8 cm³/g respectively). However, beyond the optimal parameters of L4, the deliverable capacity of arsine decreases significantly as the pore size and pore volumes increase as shown by L6 (70 g/L, 27 Å, and 3.3 cm³/g respectively). An embodiment includes a MOF in which the metal ion comprises $Cu^{2+}$ and the at least bidentate organic ligand is selected from rht ligands of precursors L1, L2, L3, L4 and L5.

Figure 1K:
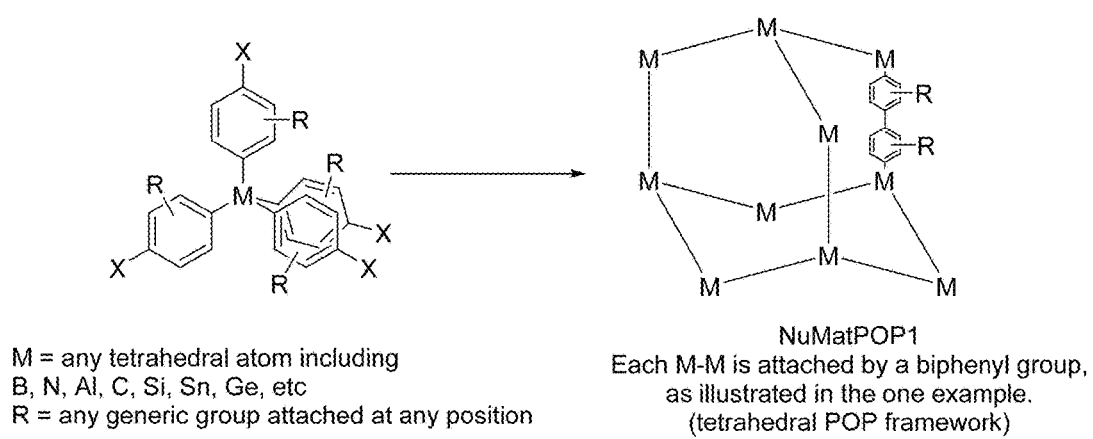
Figure 3E:
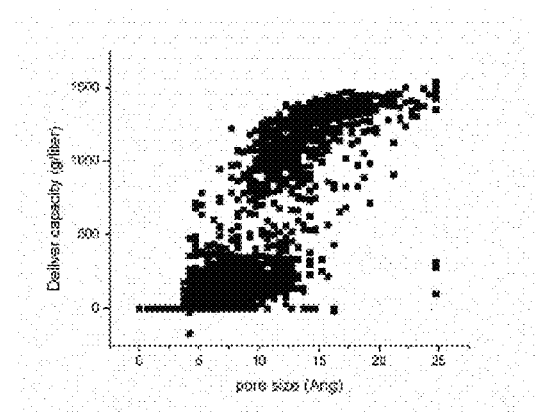
Figure 3F:
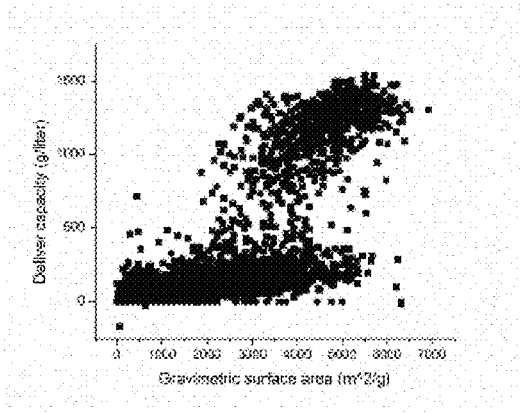
Figure 3G:
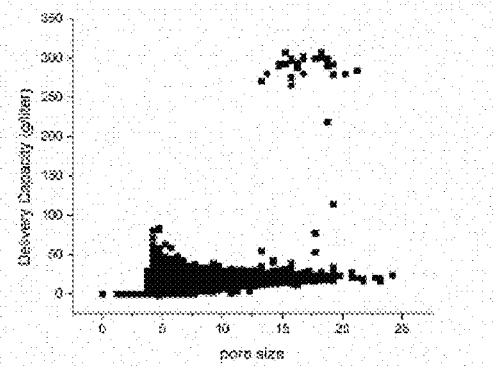
Figure 3H:
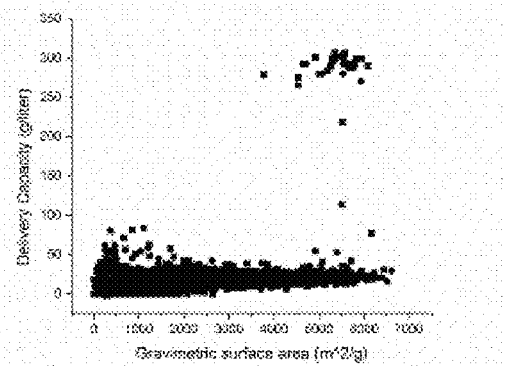
Figure 3I:
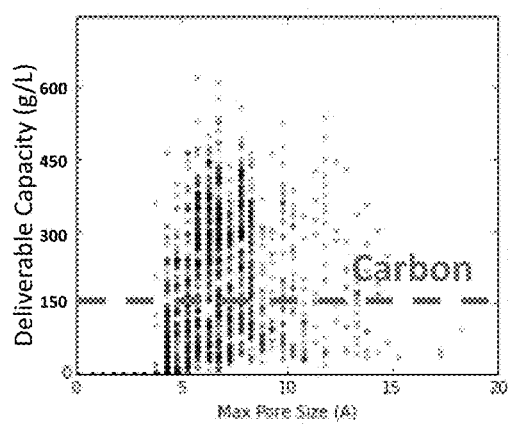
Figure 3J:
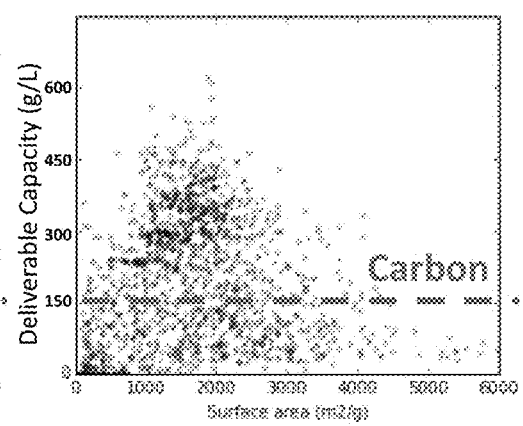
Figure 9A:
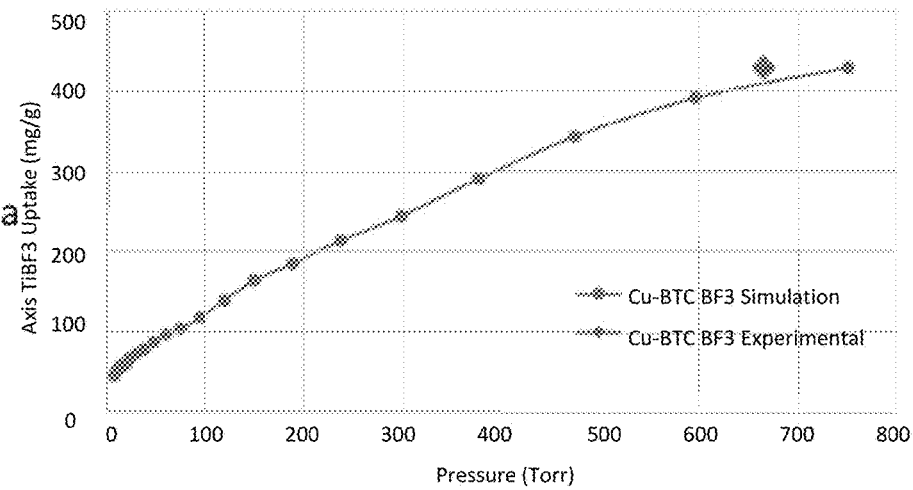
FIGS. 9a-9c are plots illustrating the storage capacity of electronic gases in various adsorbents as a function of pressure (a) $BF_3$ in Cu-BTC, (b) $AsH_3$ in ZnBDCDABCO, and (c) $GeF_4$ in Cu-BTC.
Figure 9B:
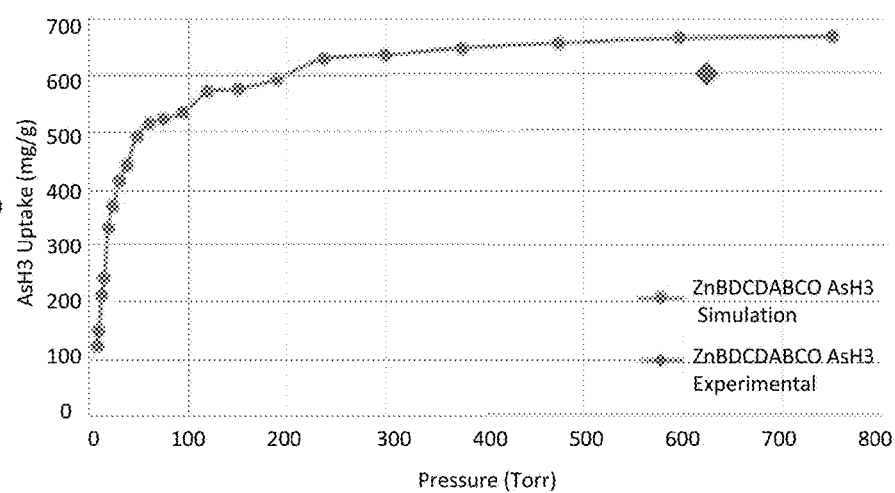
Figure 9C:
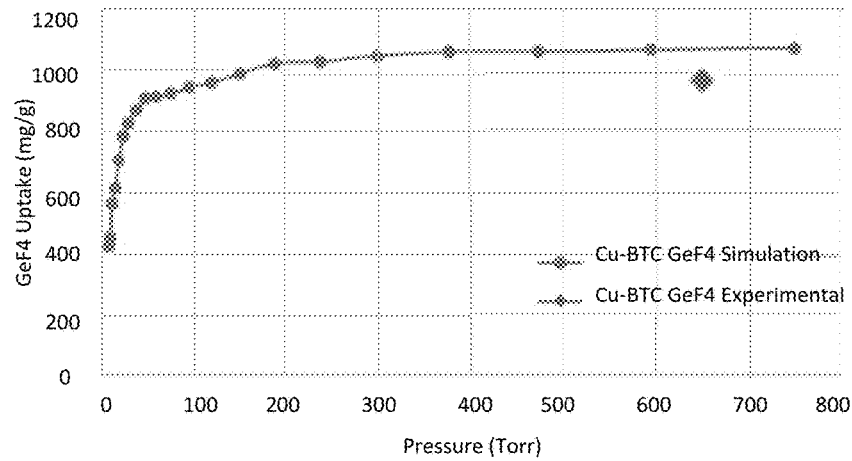

A selection of MOFs with different types of frameworks (FIGS. 1e-j) were synthesized, i.e. pillared-paddlewheel (ZnBDCDABCO), paddlewheel (Cu-BTC), rht (NU-125), $ZnO_4$ (MOF-5), $Zr_6O_{32}$ (UiO-66), and heterocycle frameworks (ZIF-8). Additionally, a porous organic polymer (POP) was also synthesized (FIG. 1k). These materials were filled with electronic gases at pressures below 760 torr and the capacities were measured and compared to the modeled simulations. For example, the experimental capacity of $BF_3$ in Cu-BTC measured at 650 torr and 25° C. was found to be 440 milligrams of $BF_3$ per gram of adsorbent (i.e. 440 mg/g) and this result showed very good agreement with the simulated $BF_3$ isotherm (FIG. 9a). This agreement was further observed for the experimentally measured sub atmospheric storage of $AsH_3$ in ZnBDCDABCO (600 mg/g measured at 650 torr and 25° C.) as shown in FIG. 9b.

An embodiment includes using MOFs as sorbents wherein the MOF causes an increase in density for the adsorbed electronic gas measured at 650 torr and 25° C. More specifically, the MOF has a fill density for arsine of 0.33 to 3.8 grams of arsine per gram of MOF (i.e. g/g) and 172 to 850 grams of arsine per liter of volume (i.e. g/L). Moreover, the embodiment includes using MOF as an adsorbent in cylinder with a fill density for boron trifluoride of 0.35 to 3.5 g/g and a fill density of 150 to 600 g/L. Furthermore, the embodiment includes a MOF with a fill density for phosphine of 0.17 to 1.7 g/g and 70 to 400 g/L. The embodiment includes MOFs able to store and deliver germanium tetrafluoride having a fill density of 0.8 to 8.0 g/g and 400 to 2,000 g/L. The embodiment includes MOFs with storage capacities for a variety of different gases used to manufacture semiconductors and other electronic components selected from a group consisting of hydride gases, halide gases, and organometallic Group V gaseous compounds including, but not limited to, ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

The embodiment also includes using MOFs as sorbents for electronic gas wherein the metal ion(s) used to form the MOF are selected from $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co_{2+}$, $Ni^{2+}$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and combinations thereof. The embodiment includes observations from the modeling simulations where the maximum storage capacity for electronic gases at below atmospheric pressure is found in a series of MOFs having pore size distributions of 3 to 32 Å (see FIGS. 3a, 3c, 3e, 3g, and 3i). Additionally, the embodiment includes MOFs comprising gravimetric surface areas between 1,000 and 14,500 m²/g (see FIGS. 3b, 3d, 3f, 3h, and 3j for simulations comparing deliverable capacity and surface area). The embodiment includes MOFs having different physical forms. Typically MOFs are synthesized in powder form however this embodiment also includes forms such as powder, microcrystals, crystals, granules, pellets, spheres, and combinations of these forms wherein the physical form has an average diameter between 0.1 to 10.0 mm. The physical forms of the MOFs have various bulk densities after filled inside the cylinder. These bulk densities range from 0.2 to 2.5 g/L. Another embodiment also includes forming the powder into pellets, disks, or a monolithic body (as illustrated in FIGS. 8a to 8c).

The embodiment also includes using MOFs that are composed of different framework types including MOFs with open coordination sites allowing substrate to metal interactions or binding. Additionally the embodiment includes MOFs that have metal nodes where substrate-metal interactions are suppressed because the metals in the nodes are coordinatively saturated because of maximized interactions with the ligands in the framework. More specifically these types of MOF frameworks, included in the embodiment, are listed as pillared-paddlewheel (such as ZnBDCDABCO in FIG. 1e), paddlewheel (such as Cu-BTC in FIG. 1f), rht (such as NU-125 in FIG. 1g and MOFs with extended linkers in FIGS. 5a and 5b), $ZnO_4$ (such as MOF-5 in FIG. 1h) $Zr_6O_{32}$ (such as UiO-66 in FIG. 1i and MOFs with extended linkers in FIGS. 4a and 4b) and heterocycle frameworks (such as ZIF-8 in FIG. 1j).

Once the MOFs were filled and charged with the electronic gases, the purity of the storage gas was measured. In the case of ZnBDCDABCO MOF, $PH_3$ was filled to a pressure of 650 torr at 25 C and the adsorbed $PH_3$ was desorbed and analyzed using a Residual Gas Analyzer (RGA) which measured trace gas impurities. The discharged $PH_3$ gas had 95 ppm of total impurities. Similarly, ZnBDCDABCO MOF was charged with $AsH_3$ to pressures below 760 torr Under vacuum, the adsorbed $AsH_3$ was removed and the discharged gas had 176 ppm of impurities. Having a very high purity of discharged gas is often difficult with adsorbent materials given the highly reactive nature of $AsH_3$. $AsH_3$ will react rapidly with oxidizing species to produce hydrogen and other impurities that drastically increase the pressure of filled cylinder. The resulting high pressure disqualifies the sub atmospheric safety benefits. Moreover, impurities above 2000 ppm are undesirable for ion implantation. In the present case, the ZnBDCDABCO MOF does not cause major decomposition given the nature of the metal node, wherein each zinc metal ion is fully saturated with organic ligands that tie the framework of the MOF together. The fully coordinatively saturated metal node prevents metal-arsine binding that ultimately could result in reduction/oxidation mechanisms that produce unwanted impurities.

Having filled the ZnBDCDABCO MOF with $AsH_3$ to pressures below atmospheric pressure, the gas was nearly completely discharged under vacuum. Ultimately, greater than 95% of the adsorbed gas was fully removed from the MOF-based $AsH_3$ filled cylinder. For example, 96-99% may be fully removed. This is highly advantageous compared to SAGs, which often have a "heel" (gas that is unable to be extracted at discharge pressures of 5 torr) exceeding 10% of the total adsorbed gas in a given system.

Another embodiment includes a MOF wherein the electronic gas dispensed from the adsorbent contains less than 2,000 ppm of trace impurities including water, carbon dioxide, hydrogen, nitrogen, oxygen, and argon. As mentioned above, the low levels of impurities are a result of a lack of hydrolyzing species or oxidizing species within the MOF framework, also included in this embodiment. Additionally, an embodiment includes a MOF where the dispensed gas is greater than or equal to 50% of the total adsorption capacity.

Additionally, a porous organic polymer (POP) was synthesized from a tetrahedral monomer (FIG. 1k where R=H and M=C) and this POP was measured for $AsH_3$ capacity. This material, named PAF-1, stored 0.60 g/g of $AsH_3$ measured at 650 torr at 25 C. After charging the cylinder with $AsH_3$, the gas was removed under vacuum and the impurity content was found to be 168 ppm. The relatively high arsine capacity for these POP frameworks composed of tetrahedral monomers is due to a combination of high porosity of the parent materials (surface areas ranging from 1,880 to 7,100 $m^2/g$, pore volumes ranging from 0.7 to 3.0 cc/g) and the short-range crystallinity of the diamondoid-like networks. The well-defined short-crystallinity of these diamondoid is in contrast to the ill-defined nature of typical activated carbon sorbents.

Another embodiment includes the method of using a POP, comprising the polymerization of one organic monomer, or a mixture of a variety of organic monomers, where the POP is used as an adsorbent in a cylinder to store and deliver electronic gases. The POP has a storage capacity of at least 70 g/L and at most 840 g/L measured at 650 torr and 25° C. Another embodiment includes POPs with diamondoid networks (that is extended networks that have similar geometries to non-porous carbon networks that make-up diamonds) wherein the monomers are tetrahedral (such as in FIG. 1k).

An embodiment includes using POPs as sorbents wherein the POP causes an increase in density for the adsorbed electronic gas measured at 650 torr and 25° C. More specifically, the POP has a fill density for arsine of 0.45 to 4.5 g/g and 172 to 840 g/L. Moreover, the embodiment includes using POPs as an adsorbent in cylinder with a fill density for boron trifluoride of 0.35 to 3.5 g/g and a fill density of 200 to 500 g/L. Furthermore, the embodiment includes a POP with a fill density for phosphine of 0.17 to 1.7 g/g and 70 to 400 g/L. The embodiment includes POPs able to store and deliver germanium tetrafluoride having a fill density of 0.8 to 8.0 g/g and 400 to 2,000 g/L. The embodiment includes POPs with storage capacities for a variety of different gases used to manufacture semiconductors and other electronic components selected from a group consisting of hydride gases, halide gases, and organometallic Group V gaseous compounds including, but not limited to ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

The embodiment includes POPs having pore size distributions of 3 to 32 Å. Additionally, the embodiment includes POPs comprising gravimetric surface areas between 1,000 and 14,500 $m^2/g$. The embodiment includes POPs having different physical forms. Typically POPs are synthesized in powder form however this also includes forms such as powder, microcrystals, crystals, granules, pellets, spheres, and combinations of these forms wherein the physical form has an average diameter between 0.1 to 10.0 mm. Another embodiment also includes forming the powder into pellets, disks, or a monolithic body (as illustrated in FIGS. 8a to 8c). Another embodiment includes physical forms of the POPs have various bulk densities after filled inside the cylinder. These bulk densities range from 0.2 to 2.0 g/L. A further embodiment includes dispensing the electronic gas that has below 2000 ppm of trace impurities and a less than or equal to 50% heel.

The gas storage and dispensing apparatus are filled with MOFs using shapes of MOF or POP materials including monolithic, pellet or disk-shape and/or other forms (FIG. 8a-9c). Embodiments include MOF or POP based structures including: (a) a pellet or powder filed tank, (b) a disk filled tank and (c) a monolithic filled tank. The MOF or POP-filled tank can be equipped with a thermal management system to prevent the loss of deliverable capacity due to heat generation or heat loss. The MOF or POP-filled tank may be incorporated into gas delivery system that can include, but is not limited to, a pressure regulator, pressure transducer, filter, mass flow controller, valve, pipe or other structures. An embodiment includes a method of using a metal organic framework (MOF) comprising a metal ion and an at least bidentate organic ligand.

Any suitable tank may be used, such as a high pressure tank, an atmospheric tank or sub-atmospheric gas storage tank, such as the SDS® or SAGE® brand sub-atmospheric gas storage cylinders from ATMI, Inc. may be used.

A further embodiment includes the manufacturing or method of making of MOFs or POPs for the purpose of storing and delivering electronic gases with deliverable storage capacities of at least 70 g/L and ranging between 70 to 840 g/L. A further embodiment includes the manufacturing of MOFs or POPs where the list of electronic gases stored and delivered are selected from a group consisting of hydride gases, halide gases, and organometallic Group V gaseous compounds including, but not limited to ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

Furthermore an embodiment includes the method of making MOFs to store and deliver electronic gases wherein the MOF is composed of metal ions selected from selected from $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{5+}$, $V^{4+}$, $V^{3+}$, $Nb^{3+}$, $Ta^{3+}$, $Cr^{3+}$, $Cr^{2+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ni^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and combinations thereof. A further embodiment includes the method of making MOFs with the purpose of storing and delivering electronic gases where the MOF is characterized by a surface area between 1,000 and 14,500 $m^2/g$, a pore volume between 1 and 3 cc/g, and pore sizes ranging between 3 and 32 Å.

More specifically, another embodiment includes making MOFs to store electronic gases at pressures below ambient wherein the MOFs are synthesized from metal ions and precursor organic building blocks: $Zr^{4+}$ ions and terephthalic acid (as found in FIG. 1*i*), $Zr^{4+}$ and diphenyl dicarboxylic acid (as shown in UiO67 in FIG. 4*a*), and $Cu^{2+}$ ions and trimesic acid. Further embodiments include making MOFs for storing and delivering arsine or boron trifluoride where the MOF is synthesized from organic ligands comprising terephthalic acid and/or DABCO (also named 1,4-diazabicyclo[2.2.2]octane). Another embodiment includes MOFs to store and deliver an electronic gas other than arsine, phosphine, boron trifluoride, or germanium tetrafluoride.

A further embodiment includes taking a gas storage device such as a cylinder, tanks, or gas dispensing apparatus and filling the device with a sorbent material, either a MOF or a POP, and the sorbent material meets criteria via supra. The embodiment includes the storage and delivery apparatus wherein the sorbent material, either a MOF or a POP, is formed into small pellets or granules, larger disks with a shape similar to a hockey puck, or even larger monolith shapes that encompasses near the entire size of the vessel.

The following references teach aspects of the fabrication of MOFs and are hereby incorporated by reference:
1. Li, H., et al., Design and synthesis of an exceptionally stable and highly porous metal-organic framework. Nature, 1999. 402 (6759): p. 276-279.
2. Ferey, G., Hybrid porous solids: past, present, future. Chemical Society Reviews, 2008. 37 (1): p. 191-214.
3. Wilmer, C. E., et al., Large-scale screening of hypothetical metal-organic frameworks. Nature Chemistry, 2012. 4 (2): p. 83-89.
4. Farha, O. K., et al., De novo synthesis of a metal-organic framework material featuring ultrahigh surface area and gas storage capacities. Nature Chemistry, 2010. 2(11): p. 944-948.
5. Furukawa, H., et al., Ultrahigh Porosity in Metal-Organic Frameworks. Science, 2010. 329 (5990): p. 424-428.
6. Ferey, G., et al., A chromium terephthalate-based solid with unusually large pore volumes and surface area. Science, 2005. 309 (5743): p. 2040-2042.
7. Chae, H. K., et al., A route to high surface area, porosity and inclusion of large molecules in crystals. Nature, 2004. 427 (6974): p. 523-527.
8. Wilmer, C. E., et al., Structure-property relationships of porous materials for carbon dioxide separation and capture. Energy & Environmental Science, 2012. 5 (12): p. 9849-9856.
9. Raynor, M. W., et al., Sub-atmospheric pressure gas sources for bulk storage and delivery of arsine and phosphine to MOCVD tools. Journal of Crystal Growth, 2003. 248: p. 77-81.
10. Nelson, A. P., et al., Supercritical Processing as a Route to High Internal Surface Areas and Permanent Microporosity in Metal-Organic Framework Materials. Journal of the American Chemical Society, 2009. 131 (2): p. 458.
11. Farha, O. K., et al., Metal-Organic Framework Materials with Ultrahigh Surface Areas: Is the Sky the Limit? Journal of the American Chemical Society, 2012. 134 (36): p. 15016-15021.
12. Matheson. Semiconductor Gases: Semiconductor Pure Gases. Available from: http://www.mathesongas.com/catalog/category.aspx?category_id=9&mode=EDGE.
13. Brown, A. and K. Olander. New regs on sub-atmospheric gas sources reduce risk, improve safety. Aug. 1, 2009]; Available from:
http://www.electroiq.com/articles/sst/print/volume-52/issue-8/features/cover-article/new-regs-on-sub-atmospheric-gas-sources-reduce-risk-improve-safety.html.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of making a metal organic framework (MOF) comprising reacting a metal ion and an at least bidentate organic ligand, wherein the metal ion and the organic ligand are selected to provide a deliverable adsorption capacity of at least 70 g/l for an electronic gas;
wherein the electronic gas is selected from a group consisting of hydride gases, halide gases, and organometallic Group V gaseous compounds.

2. The method of claim 1, wherein the deliverable adsorption capacity is 70 to 840 g/l for the electronic gas.

3. The method of claim 1, wherein the electronic gas is selected from a group consisting of ammonia, arsine, boron trichloride, boron trifluoride, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride and acetylene.

4. A method of making a metal organic framework (MOF) comprising reacting a metal ion and an at least bidentate organic ligand, wherein the metal ion and the organic ligand are selected to provide a deliverable adsorption capacity of at least 70 g/l for an electronic gas, wherein the metal ion is selected from Li+, Na+, K+, Rb+, Be2+, Mg2+, Ca2+, Sr2+, Ba2+, Sc3+, Y3+, Ti4+, Zr4+, Hf4+, V5+, V4+, V3+, Nb3+, Ta3+, Cr3+, Cr2+, Mo3+, W3+, Mn3+, Fe3+, Fe2+, Ru3+, Ru2+, Os3+, Os2+, Co3+, Co2+, Ni2+, Ni+, Pd2+, Pd+, Pt2+, Pt+, Cu2+, Cu+, Ag+, Au+, Zn2+, Al3+, Ga3+, In3+, Si4+, Si2+, Ge4+, Ge2+, Sn4+, Sn2+, Bi5+, Bi3+, Cd2+, Mn2+, Tb3+, Gd3+, Ce3+, La3+ and Cr4+, and combinations thereof.

5. The method of claim 1, wherein the electronic gas comprises arsine and the at least bidentate organic ligand is selected from terephthalic acid and/or 1,4-diazabicyclo[2.2.2]octane (DABCO).

6. A method of making a metal organic framework (MOF) comprising reacting a metal ion and an at least bidentate organic ligand, wherein the metal ion and the organic ligand are selected to provide a deliverable adsorption capacity of at least 70 g/l for an electronic gas, wherein:
the MOF comprises a gravimetric surface area between 1,000 and 14,500 m²/g, a pore volume between 1 and 3 cm²/g, and an average pore size between 3 Å and 32 Å; and
the electronic gas comprises boron trifluoride; and
the at least bidentate organic ligand comprises trimesic acid.

7. A method of making a metal organic framework (MOF) comprising reacting a metal ion and an at least bidentate organic ligand, wherein the metal ion and the organic ligand are selected to provide a deliverable adsorption capacity of at least 70 g/l for an electronic gas, wherein the MOF is formed into pellets, disks or a monolithic body.

8. A metal organic framework (MOF) comprising the coordination product of a metal ion and an at least bidentate organic ligand, wherein the metal ion and the organic ligand are selected to store an electronic gas other than arsine, phosphine, boron trifluoride, or germanium tetrafluoride, wherein the electronic gas is selected from a group consisting of hydride gases, halide gases, and organometallic Group V gaseous compounds.

9. The MOF of claim 8, wherein the electronic gas is selected from a group consisting of ammonia, boron trichloride, diborane, dichlorosilane, dichlorosilane, difluoromethane, disilane, fluorine, germane, hexafluoroethane, hydrogen bromide, hydrogen chloride, hydrogen fluoride, hydrogen selenide, hydrogen telluride, hydrogen sulfide, methyl fluoride, methyl silane,-nitrogen trifluoride, perfluoropropane, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride and acetylene.

10. A gas storage and dispensing apparatus comprising a tank filled with the MOF of claim 8.

11. The apparatus of claim 10, wherein the apparatus comprises a MOF pellet filled tank.

12. The apparatus of claim 10, wherein the apparatus comprises a MOF disk filled tank.

13. The apparatus of claim 10, wherein the apparatus comprises a monolithic MOF filled tank.

14. The method of claim 4, wherein the deliverable adsorption capacity is 70 to 840 g/l for the electronic gas.

15. The method of claim 4, wherein the electronic gas is selected from a group consisting of ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

16. The method of claim 4, wherein the electronic gas comprises arsine and the at least bidentate organic ligand is selected from terephthalic acid and/or 1,4-diazabicyclo[2.2.2]octane (DABCO).

17. The method of claim 6, wherein the deliverable adsorption capacity is 70 to 840 g/l for the electronic gas.

18. The method of claim 6, wherein the electronic gas is selected from a group consisting of ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

19. The method of claim 6, wherein the electronic gas comprises arsine and the at least bidentate organic ligand is selected from terephthalic acid and/or 1,4-diazabicyclo[2.2.2]octane (DABCO).

20. The method of claim 7, wherein the deliverable adsorption capacity is 70 to 840 g/l for the electronic gas.

21. The method of claim 7, wherein the electronic gas is selected from a group consisting of ammonia, arsine, boron trichloride, boron trifluoride, carbonyl sulfide, chlorine, deuterium, diborane, dichlorosilane, dichlorosilane, difluoromethane, disilane, fluorine, germane, germanium tetrafluoride, hexafluoroethane, hydrogen bromide, hydrogen chloride, hydrogen fluoride, hydrogen selenide, hydrogen telluride, hydrogen sulfide, methyl fluoride, methyl silane, neon, nitric organic, nitrogen trifluoride, perfluoropropane, phosphine, silane, silicon tetrachloride, tetrafluoromethane, tetramethylsilane, silicon tetrafluoride, stibine, sulfur hexafluoride, trichlorosilane, trifluoromethane, trimethylsilane, tungsten hexafluoride, acetylene, and organometallic gaseous reagents.

22. The method of claim 7, wherein the electronic gas comprises arsine and the at least bidentate organic ligand is selected from terephthalic acid and/or 1,4-diazabicyclo[2.2.2]octane (DABCO).

* * * * *

UNITED STATES PATENT AND TRADEMARK OFFICE
CERTIFICATE OF CORRECTION

PATENT NO. : 9,751,074 B2  
APPLICATION NO. : 14/828097  
DATED : September 5, 2017  
INVENTOR(S) : Han Sung Kim et al.

Page 1 of 1

It is certified that error appears in the above-identified patent and that said Letters Patent is hereby corrected as shown below:

In the Specification

Column 1, after the Related Applications section, please insert the paragraph pertaining to Government Sponsored Research and Development as follows:
--STATEMENT REGARDING GOVERNMENT SPONSORED RESEARCH OR DEVELOPMENT
This invention was made with Government support under contract number 1430682 awarded by the National Science Foundation. The Government has certain rights in the invention.--

Signed and Sealed this  
Sixth Day of January, 2026

John A. Squires  
*Director of the United States Patent and Trademark Office*